US009990477B2

(12) United States Patent
Sheppard

(10) Patent No.: US 9,990,477 B2
(45) Date of Patent: Jun. 5, 2018

(54) DYNAMIC NETWORK CONSTRUCTION

(71) Applicant: Pearson Education, Inc., New York, NY (US)

(72) Inventor: Paul Sheppard, Brookline, MA (US)

(73) Assignee: PEARSON EDUCATION, INC., Upper Saddle River, NJ (US)

( * ) Notice: Subject to any disclaimer, the term of this patent is extended or adjusted under 35 U.S.C. 154(b) by 0 days. days.

(21) Appl. No.: 15/224,452

(22) Filed: Jul. 29, 2016

(65) Prior Publication Data
US 2016/0337475 A1 Nov. 17, 2016

Related U.S. Application Data

(63) Continuation of application No. 14/498,248, filed on Sep. 26, 2014, now Pat. No. 9,436,808.

(60) Provisional application No. 61/883,049, filed on Sep. 26, 2013.

(51) Int. Cl.
G06F 21/10 (2013.01)
H04L 29/08 (2006.01)
H04N 21/25 (2011.01)
H04N 21/466 (2011.01)
H04L 12/24 (2006.01)
G06Q 30/06 (2012.01)

(52) U.S. Cl.
CPC ............ G06F 21/105 (2013.01); G06F 21/10 (2013.01); H04L 41/082 (2013.01); H04L 67/10 (2013.01); H04L 67/1097 (2013.01); H04L 67/327 (2013.01); H04N 21/251 (2013.01); H04N 21/4668 (2013.01); G06Q 30/06 (2013.01)

(58) Field of Classification Search
CPC ......................... H04N 21/4668; H04N 21/251; G06F 21/105; G06F 21/10; G06Q 30/06; H04L 67/10; H04L 67/327
See application file for complete search history.

(56) References Cited

U.S. PATENT DOCUMENTS

| 8,296,190 | B1 | 10/2012 | Lemmons et al. |
| 8,819,243 | B1 | 8/2014 | Cope et al. |
| 9,436,808 | B2 | 9/2016 | Sheppard |
| 2005/0027700 | A1 | 2/2005 | Turner et al. |
| 2006/0271516 | A1 | 11/2006 | Kortum et al. |
| 2007/0168513 | A1* | 7/2007 | Weiskopf ................ G06F 21/10 709/225 |
| 2008/0254430 | A1 | 10/2008 | Woolf et al. |
| 2009/0100013 | A1 | 4/2009 | Fein et al. |
| 2009/0198237 | A1* | 8/2009 | Downey ............ A61B 17/7098 606/62 |

(Continued)

Primary Examiner — Robert B Leung
(74) Attorney, Agent, or Firm — Kilpatrick Townsend & Stockton LLP

(57) ABSTRACT

A dynamic network is disclosed herein. The dynamic network can include a central server, one or several user devices, one or several remote servers, and a database server. The dynamic network can be created in response to a user request for content to be used in a compilation. The central server can identify one or several of the remote servers as potentially containing the requested content, and can communicate with the identified one or several of the remote servers to receive that content. Additionally, the server can identify and connect with one or several servers containing terms of use information for the requested content.

19 Claims, 9 Drawing Sheets

(56) References Cited

U.S. PATENT DOCUMENTS

| | | | | |
|---|---|---|---|---|
| 2011/0029435 A1* | 2/2011 | Ronen | ............ | G06Q 10/10 |
| | | | | 705/53 |
| 2011/0306027 A1* | 12/2011 | Bridges | ............ | G09B 5/00 |
| | | | | 434/322 |
| 2013/0110675 A1 | 5/2013 | Bouw | | |
| 2013/0282521 A1 | 10/2013 | Garg et al. | | |
| 2014/0024009 A1* | 1/2014 | Nealon | ............ | G09B 5/12 |
| | | | | 434/362 |

* cited by examiner

DYNAMIC NETWORK CONSTRUCTION

CROSS-REFERENCES TO RELATED APPLICATIONS

The present application is a continuation of U.S. application Ser. No. 14/498,248 filed Sep. 26, 2014, and entitled "DYNAMIC NETWORK CONSTRUCTION," which claims the benefit of U.S. Provisional Application No. 61/883,049 entitled "DYNAMIC RIGHTS ENGINE," and filed on Sep. 26, 2013, the entire contents of each of which are hereby incorporated herein by reference for all purposes.

BACKGROUND

A computer network or data network is a telecommunications network that allows computers to exchange data. In computer networks, networked computing devices pass data to each other along data connections. Data is transferred in the form of packets. The connections (network links) between nodes are established using either cable media or wireless media.

However, while computer networks provide many advantages, new methods, techniques, and systems are required to further improve their usefulness.

BRIEF SUMMARY

One aspect of the present disclosure relates to a networked system. The networked system can include a first server having a first database containing at least one piece of content, a second server containing a second database containing rights information indicating terms of use of the at least one piece of content contained in the first database of the first server, a third server containing a third database containing consideration information, which consideration information identifies consideration requirements for use of the at least one piece of content contained in the first database of the first server, and a central server. In some embodiments, the central server can receive an input from a user device, which input can include a content request and content use information, which content use information can include at least one of: an indication of the context of the intended use of the content, and an indication of the quantity of use of the content. The central server can identify a set of servers containing at least one of the content and information relating to the content, and in some embodiments, the first, second, and third servers are included in this set of servers. The central server can output a signal to the set of servers, which signal can include a request for self-identification by some or all of the set of servers containing at least one of the content and the information relating to the content, and in some embodiments, the central server can receive at least one signal identifying the some or all of the set of servers containing at least one of the content or the information relating to the content, which some or all of the set of servers can include the first, second, and third servers. The central server can generate a network including the some or all of the set of servers containing at least one of the content or information relating to the content, which network includes the first, second, and third servers, receive signals containing at least one of the content and the information relating to the content from the first, second, and third servers, and output a signal containing at least one of the content and the information relating to the content to the user device.

In some embodiments, the system can include a user device that can include, for example, a sensor that can receive an input from a user. In some embodiments, the sensor can be a pressure activated sensor. In some embodiments, the central server can compile the signals containing at least one of the content and the information relating to the content to create the outputted signal.

In one aspect, the present disclosure relates to a networking system including a memory containing at least one database, and a server communicatingly connected to the memory. In some embodiments, the server can including coded instructions to receive an input including a compilation request from a user device, which compilation request can include a content request and content use information, and which content use information can include at least one of: an indication of the context of the intended use of the content, and an indication of the quantity of use of the content. The server can include coded instructions to identify a set of servers containing at least one of the content and information relating to the content, output a signal to the set of servers, which signal comprises a request for self-identification by some or all of the set of servers containing at least one of the content and the information relating to the content, receive at least one signal identifying the some or all of the set of servers containing at least one of the content or the information relating to the content, generate a communication network with the some or all of the set of servers containing at least one of the content or information relating to the content, receive at least one signal containing at least one of the content and the information relating to the content from the some or all of the set of servers containing at least one of the content or information relating to the content, and output a signal containing at least one of the content and the information relating to the content to the user device.

In some embodiments, the content use information identifies intended end use details for the content. In some embodiments, the content can include consumable media. In some embodiments, the content request can include a request for first content and for second content. In some embodiments, the information relating to the content can include at least one of rights information identifying terms of use of the content and consideration requirements for use of the piece of content.

In some embodiments, the server can include coded instructions to extract first terms of use information from the information relating to the content, which first terms of use information indicate whether the first content is licensable. In some embodiments, the server can include coded instructions to extract second terms of use information from the information relating to the content, which second terms of use information indicate whether the second content is licensable. In some embodiments, the server can include coded instructions to extract first consideration requirements from the information relating to the content, which first consideration requirements indicate pricing for use of the first content. In some embodiments, the server can include coded instructions to extract second consideration requirements from the information relating to the content, which second consideration requirements indicate whether pricing for use of the second content.

In some embodiments, the server can include coded instructions to receive a placement indicator, which placement indicator identifies a placement of the first content and the second content within a dataset. In some embodiments, the dataset can be an e-document. In some embodiments, the server can include coded instructions to generate the dataset containing the first content and the second content, and generate a license for the dataset, which license for the compilation includes a license for the first content and a license for the second content.

In one aspect, the present disclosure relates to a method of generating a rights pedigree. The method includes receiving a first input signal at a server, which input signal includes a compilation request including a compilation context including end-use details of a compilation, and which compilation includes an aggregate of data. The method can include receiving an indicator of a first content selection at the server, which indicator of the first content selection identifies first content which first content can include consumable media, identifying a license status of the first content, which license status indicates whether the first content is licensable for the compilation context, receiving an indicator of a second content selection, which indicator of the second content selection identifies second content, the second content including consumable media, identifying a license status of the second content, which license status indicates whether the second content is licensable for the compilation context, and receiving an indicator of the placement of the first and the second content within the compilation. In some embodiments, the method can include generating the compilation including the first and second content in the indicated placement, receiving an indicator of a compilation license, which compilation license identifies the conditions under which the compilation is licensable, and associating the compilation license, including a license term for the first content, and a license term for the second content with the compilation.

In some embodiments, identifying a license status of the first content includes: determining if the first content is contained in a database in memory associated with the server, identifying a set of servers containing at least one of the first content and information relating to the first content, and outputting a signal to the set of servers, which signal can include a request for self-identification by the servers of the set of servers that contain at least one of the first content and the information relating to the first content. In some embodiments, identifying the license status of the first content can further include identifying a price for use of the first content, which price for use of the first content can be affected by the end use details of the compilation. In some embodiments the method can include outputting the compilation to a database associated with the server. In some embodiments, the method can include receiving a signal from a requesting user device, which signal includes an access request to the compilation, and outputting the compilation to the requesting user device.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Figure 1:
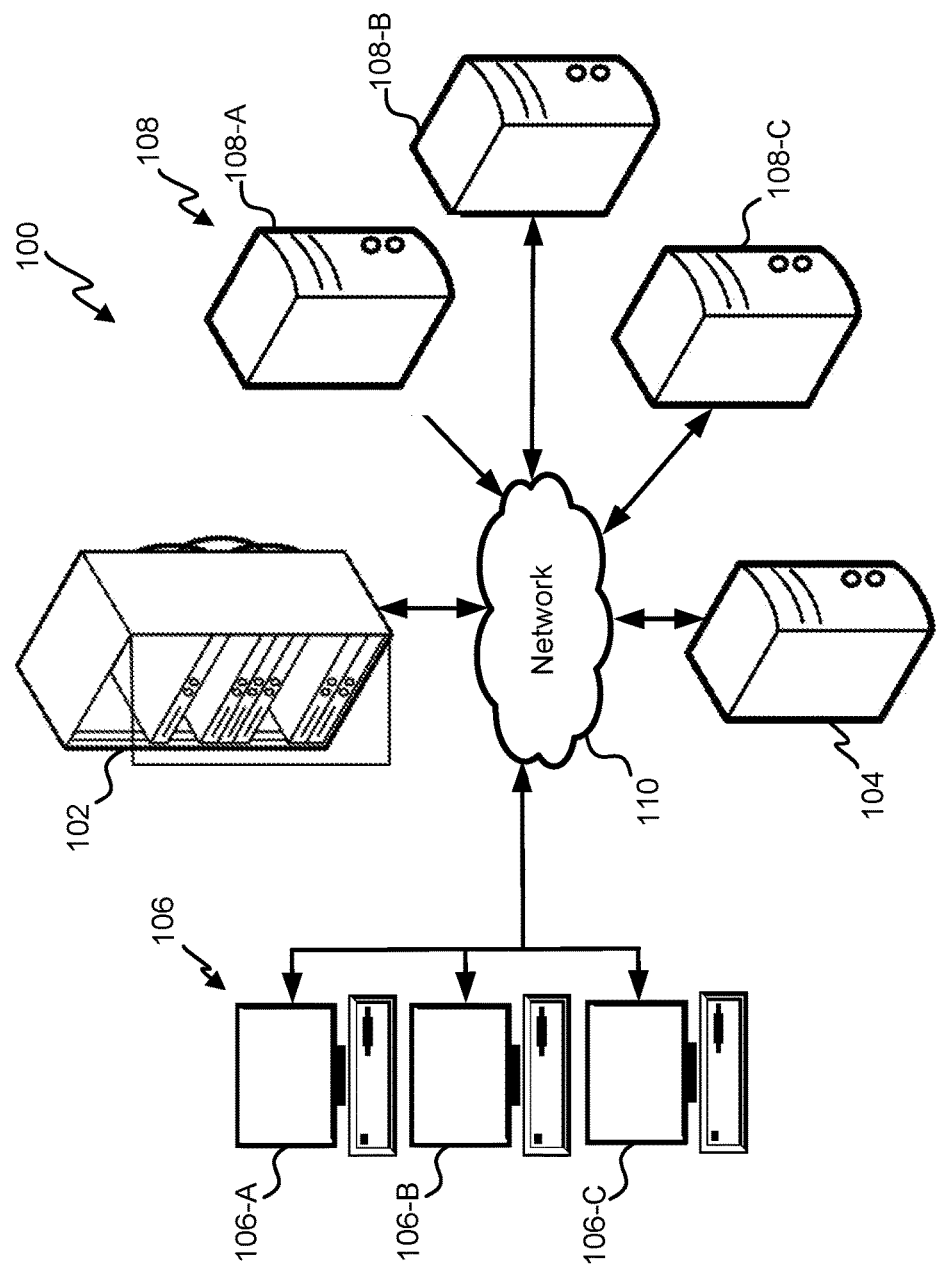
FIG. 1 is a schematic illustration of one embodiment of a compilation network.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In one embodiment, the present disclosure relates to systems and methods for the generation of a compilation of consumable media, which compilation can include two or more selected media components. In some embodiments, these compilations can be generated by the creation of a unique network of hardware components containing the consumable media, also referred to herein as the content, and information relating to the consumable media, including, for example, terms of use of the consumable media and/or consideration requirements of the consumable media. One or several servers can be selected for inclusion in the network based on a series of communications establishing the existence of relevant data at the one or several servers.

In some embodiments, the consumable media sources can be any media that can be experienced by a user and can include, for example, text, a text string, an image, a picture, sound, video, or the like. In some embodiments, a user can edit and/or create the two or more media components and identify or select the way in which the two or more media components are compiled.

In one embodiment, the user can define and/or identify the ways in which the compilation will be used, and specifically, in some embodiments, the user can provide information relating to a compilation context which can identify one or several end-uses or intended end-uses of the compilation. The end-uses of the compilation can identify how the compilation will be distributed, the extent to which the compilation will be distributed, restrictions on the distribution of the compilation, or the like. In some embodiments, the indicated end-uses can be used to determine whether the two or more media components are licensable for those indicated end-uses. In some embodiments, the indicated end-uses can be further used in determining a price for use of one or more of the two or more media components.

In some embodiments, the system and/or method can facilitate the creation of the compilation by indicating alternative media components that share a commonality with the selected media components and that offer advantages in, for example, pricing or license rights. In some embodiments, one or several alternative media components to the two or more selected media components can be identified. These alternative media components can be identified, for example, as a matter of course or if one or more of the two or more media components is not licensable for the indicated end-uses of the compilation. In one embodiment, the alternative media components can be licensable for the end-uses of the compilation. In some embodiments, the alternative media components can be identified based on the price of one or more of the two or more media components. In some embodiments, for example, the alternative media components can have a lower price and/or can result in a lower compilation price than the originally selected media component. In some embodiments, one or several of the alternative media components can be selected and can replace one or more of the originally selected two or more media components.

In some embodiments, after the selection of two or more media components has been finalized, including finalization of the placement of the two or more media components within the compilation, license status for the compilation can be identified and/or license rights for the compilation can be received. In some embodiments, this can include identification of terms and/or conditions for the licensing of and/or the use of the compilation. The license status and/or license rights for the compilation, in addition to a license term of each of the two or more media components can be associated with the compilation and can be, in some embodiments, saved within a database such as a library. Advantageously, this can generate a chain of license that allows identification of each of the licensable components of the compilation including, for example, one or several of the entire compilation and each of the two or more media components within a compilation, as well as identification of terms or restrictions of use for those licensable components.

With reference now to FIG. 1, a schematic illustration of one embodiment of a compilation network 100, also referred to herein as a compilation system, is shown. The compilation network 100 can be used in the creation of a compilation, which compilation can be the aggregate of two or more media components. The compilation can be distributed in any desired fashion and can be, for example, distributed in electronic or intangible format. In some embodiments, the compilation can be distributed as a print book, as an e-book, as a soundtrack, as a video, as webpage, or the like. The media component can be any data component and can include, for example, text, one or several text strings, all or portions of one or several documents, images, soundtracks, video, webpages, or the like. The compilation network 100 can facilitate the user in creating the compilation via the combination of the two or more media components, via the arrangement of the two or more media components, via the manipulation of the two or more media components, or the like.

The compilation network 100 includes a central server 102. The central server 102 can provide instructions to and receive information from the other components of the compilation network 100. The central server 102 can act according to stored instructions, which stored instructions can be located in memory associated with the central server 102 and/or in other components of the compilation network 100. The central server 102 can comprise one or several computing devices, computers, processors, including, for example, one or several microprocessors, such as a microprocessor from Intel® or Advanced Micro Devices, Inc.®, or the like.

The compilation network 100 can include one or several database servers 104. The one or several database servers 104 can comprise one or several storage media that can be arranged in any desired fashion. In one embodiment, for example, the database servers 104 can comprise one or several memory blade servers, hard drive servers, or the like.

Figure 2:
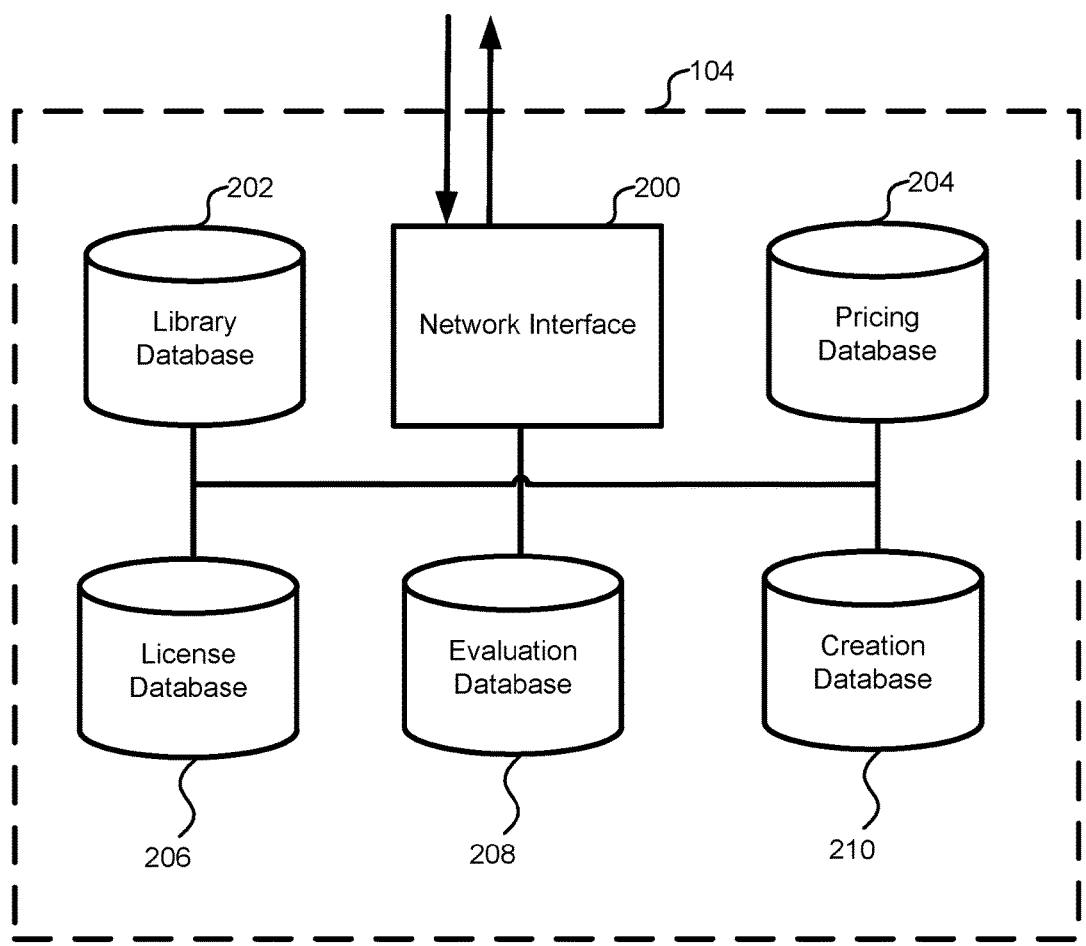
FIG. 2 is a functional schematic illustration of one embodiment of a database server of the compilation network.

With reference now to FIG. 2, a schematic illustration of one embodiment of the database server 104 is shown. As depicted, the database server 104 can include a network interface 200. The network interface 200 can allow components of the compilation system 100 to communicate with each other and with outside remote servers 108. In some embodiments, the network interface 200 can be configured to access the network 100. The network interface 200 can include features configured to send and receive information, including, for example, an antenna, a modem, a transmitter, receiver, or any other feature that can send and receive information. The network interface 200 can communicate via telephone, cable, fiber-optic, or any other wired communication network. In some embodiments, the network interface 200 can communicate via cellular networks, WLAN networks, or any other wireless network.

The database server 104 can include a plurality of databases including, for example, a library database 202. The library database 202 can include a plurality of media components. In some embodiments, the library database 202 can include the data that is the plurality of the media components, as well as data associated with the media components. In some embodiments, for example, data associated with the media components can include metadata associated with some or all of the media components. This metadata can identify aspects of the therewith associated media component such as, for example, one or several content attributes of the media component including, for example, the subject matter and/or skill level embodied in the media component, one or several license attributes of the media component including, for example, any limitations and/or restrictions on the licensable use and/or distribution of the therewith associated media component, one or several price attributes of the media component including, for example, a price and/or price structure for determining a payment amount for use or distribution of the media component, one or several rating attributes including, for example, data indicating the effectiveness of media component in facilitating attainment of desired outcome, or other similar attributes. In some embodiments, the library database 202 can be configured to allow updating of the metadata and to allow the addition and/or removal of information relating to one or several of the media components.

The database server 104 can include a pricing database 204. in some embodiments, the pricing database 204 can include pricing information. In some embodiments, the pricing database 204 can include similar pricing information to that stored within the library database 202, and in some embodiments, the pricing database 204 can include different pricing information than that stored within the library database 202. In some embodiments, for example, the pricing information stored within the pricing database 204 can identify a general price and/or price structure for determining payment amount for one or several media components. In some embodiments, for example, a media component may include specific pricing information that is applicable only to the therewith associated media component, and in some embodiments, pricing information can be general in that it is common to a plurality of media components. In such an embodiment, the price information can be stored within the pricing database 204 to thereby eliminate redundant information and increase the efficiency of memory use.

In some embodiments, the pricing database 204 can include information relating to compilation pricing. In some embodiments, for example, this information can identify a price and/or price structure for a grouping of media components and/or for the completed compilation. In one embodiment, for example, a plurality of media components can have a fixed price. Thus, in such an embodiment, a user can be charged a fixed price for, for example, combining up to a specific number of media components such as, for example, 2, 3, 4, 5, 10, 15, 20, 25, 50, 100, or any other or intermediate number of media components. In some embodiments, information relating to the compilation pricing can include information identifying compilation attributes that can increase or decrease the price of the compilation. In some embodiments, these attributes can include, for example, the details of the distribution of the compilation or the like. In one such embodiment, a print compilation can be more expensive than an electronically published compilation.

In some embodiments, the database server 104 can include a license database 206. The license database 206 can include information relating to licenses and/or licensing of one or several media components and/or compilations in some embodiments; this information can identify terms for licensing one or several of the media components and/or compilations, rights holders for one or several of the media components in the library database 202, and/or common or large-scale right holder information including, for example, identifying and/or contact information for holders of rights for media components that are not included in the library database 202.

In some embodiments, the database server 104 can include an evaluation database 208. The evaluation database 208 can include, for example, information identifying the effectiveness of one or several media components and/or compilations stored in the library database 202 and/or information for determining the effectiveness of one or several media components and/or compilations stored in library database 202. In one embodiment, for example, the evaluation database 208 can include information used by the compilation network 100 to determine the effectiveness of one or several media components. In some embodiments, the evaluation database 208 can include data gathered by the compilation network 100 that can be and/or that has been used in determining the effectiveness of one or several media components stored within the library database 202.

The database server 104 can include a creation database 210. The creation database 210 can include information relating to the creation of the compilation and/or the creation of user generated content. In some embodiments, for example, the creation database 210 can include information relating to an incomplete compilation such as, for example, the creator of the compilation, the components included in the compilation, license status of media components already in the compilation, pricing of media components already in the compilation, pricing of the currently existing compilation and/or the like. In some embodiments, information stored within the creation database 210 can be updated when the user changes details of the compilation, can be updated at regular intervals, and/or can be updated upon receipt of a user command to update the creation database 210.

Returning again to FIG. 1, the compilation network 100 can include one or several user devices 106. The one or several user devices 106 can be any device capable of use within the compilation network 100 including, for example, a computer including, for example, a personal computer laptop, a handheld device including, for example, a cell phone, a smart phone, a PDA, or the like, or any other device that is capable of receiving user inputs, providing information to the user, processing information received from the user, and communicating with the other components of the compilation network 100. In some embodiments, the one or several user devices 106 can each include one or several sensors configured to sense a physical result of one or several user actions, and to convert this sensed result into an electric signal. In some embodiments, the one or several sensors can be configured to sense pressure and/or pressures exceeding a threshold value, and can include, for example, a keyboard, a touchscreen, a mouse, or the like. In some embodiments, the one or several sensors can be configured to sense sound and/or pressure waves, and can include, for example, one or several microphones.

The one or several user devices 106 can be used by a variety of users, and in this application, the one or several user devices 106 are identified by the user of the user device 106, and can include, for example, a learner device 106-A, a teacher device 106-B, and/or an administrator device 106-C. The user devices 106 allow a user, including, for example, a learner, a student, a trainee, or the like; an educator including, for example, a teacher, a lecturer, a professor, a trainer, or the like; an administrator including, for example, a supervisor, a manager, a controller, or a maintainer of the compilation network 100, or the like to access the compilation network 100.

As depicted in FIG. 1, in some embodiments, the compilation network 100 can communicate with one or several remote servers 108. In some embodiments, the one or several remote servers 108 can be information sources that are not controlled by the compilation network 100, and specifically that are not controlled by the central server 102, but which information sources can be included in the compilation network 100 and can receive data and/or signals from and/or provide data and/or signals to the compilation network 100. Thus, in some embodiments, the compilation system can interact with and/or receive information from one or several of the remote servers 108.

In the embodiment depicted in FIG. 1, the remote servers 108 include a content server 108-A, also referred to herein as a content source and/or a first server, a user server 108-B, also referred to herein as a licensing server, and a consideration server 108-C, also referred to herein as a financial institution and/or a payment server.

In some embodiments, the content server 108-A can be the source of one or several of the media components contained within the library database 202 and/or selected for use in the compilation by the user. In some embodiments, the material source 108-A can further be a source of information relating to the licensed use and/or distribution of one or several media components.

In some embodiments, the use server 108-B can be the source of information relating to acceptable uses of the content from the content server 108-A. In some embodiments, for example, a creator of the content can store the content with the content server 108-A, and can store use information, which can include, for example information relating to terms of use of the content, such as, for example, license and/or licensing information, within the use server 108-B. In some embodiments, the use server 108-B and the content server 108-A can be the same server, in the same location, and in some embodiments, the use server 108-B and the content server 108-A can be separate servers in distinct locations.

In some embodiments, the consideration server 108-C can include information relating to consideration required for use of the content. This can include, for example, consideration in the form of a disclosure, a publication, an open-sourcing, a payment in goods, services, or currency, or the like. In some embodiments, the consideration server 108-C can be further configured to track and receive consideration for use of the content, and can, in some embodiments, track and/or receive consideration based on aspects of the compilation context, intended use of the compilation, actual use of the compilation, or the like. In some embodiments, this tracking and receipt of consideration can be facilitated and/or enabled by the interaction of one or several user devices 106, the central server 102, and the consideration server 108-C. In some embodiments, for example, one of the user devices 106 can output a signal to the central server 102 when the compilation is accessed or used. The central server 102, can, for example, increment a count, which count can be indicative of the number of times that the compilation is used and/or accessed and/or the number of users that have used and/or accessed the compilation. This count and/or associated information can be provided to the consideration server 108-C, and can be used to determine the consideration corresponding to the use and/or consumption of the content. Alternatively, in some embodiments, the central server 102 can determine the consideration corresponding to the use and/or consumption of the content based on consideration information received from the consideration server 108-C. The determined amount of consideration can be provided, and the consideration server 108-C can receive and/or store a value indicative of the receipt of the consideration.

In some embodiments, the consideration server 108-C can be a bank, a brokerage, a lender, or any other institution that transfers money on behalf of a client and in association with the transaction.

The compilation network 100 can include a network 110. The network 110 allows communication between the components of the compilation network 100. The network 110 can be, for example, a local area network (LAN), a wide area network (WAN), a wired network, wireless network, a telephone network such as, for example, a cellphone network, the Internet, the World Wide Web, or any other desired network. In some embodiments, the network 110 can use any desired communication and/or network protocols.

Figure 3:
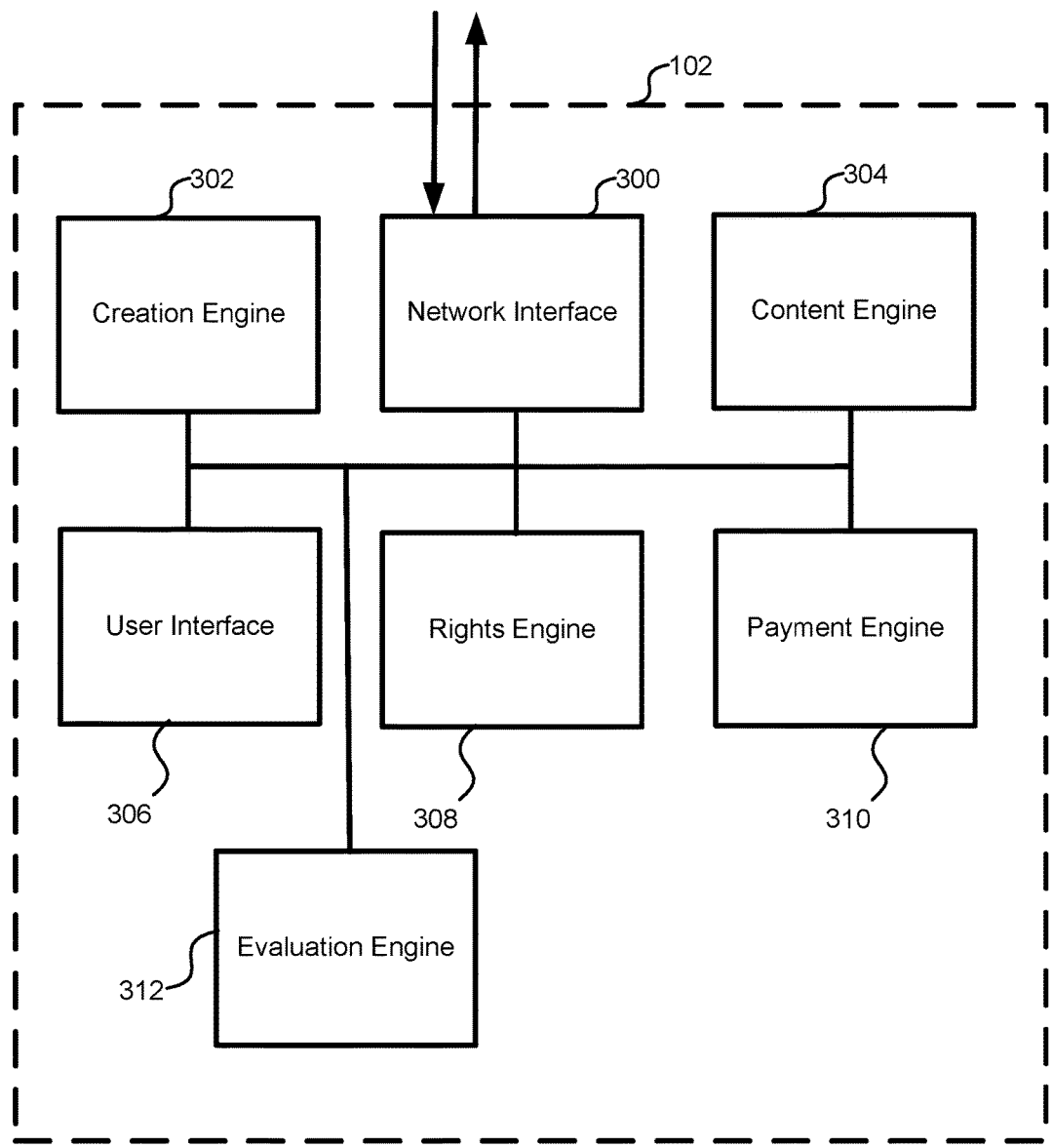
FIG. 3 is a functional schematic illustration of one embodiment of the compilation network.

With reference now to FIG. 3, a functional block diagram of one embodiment of the compilation network 100 is shown. In some embodiments, the compilation network 100 can include a network interface 300. The network interface 300 can allow components of the compilation system 102 to communicate with each other and with outside data sources 108. In some embodiments, the network interface 300 can be configured to access the network 100. The network interface 300 can include features configured to send and receive information, including, for example, an antenna, a modem, a transmitter, receiver, or any other feature that can send and receive information. The network interface 300 can communicate via telephone, cable, fiber-optic, or any other wired communication network. In some embodiments, the network interface 300 can communicate via cellular networks, WLAN networks, or any other wireless network.

The compilation network 100 can include a creation engine 302. In some embodiments, the creation engine 302 can include features and/or components that are configured and/or can be used by the user in the creation of a compilation and/or of a user generated media component, also referred to herein as user generated content. In some embodiments, this can include a user interface including tools, functions, and capabilities that can allow a user to search the database servers 104 including, for example, the library database 202, for one or several media components. In some embodiments, the creation engine 302 can include functionality configured to allow the combination of one or several media components, the manipulation of one or several media components, the creation of user generated content, the searching of outside sources 108 such as, for example, the content server 108-A for content not contained within the library database 202, or the like.

The compilation network 100 can include a content engine 304. The content engine 304 can be configured to receive the user-selected one or several media components, to retrieve information identifying attributes of the one or several media components including, for example, the subject matter and/or skill level of the one or several media components, and to identify other media components having similar attributes. In some embodiments, the content engine 304 can be further configured to retrieve information identifying one or several rating attributes including, for example, data indicating the effectiveness of the selected one or several media components in facilitating attainment of a desired outcome. In some embodiments, for example, information retrieved by content engine 304 can be retrieved from one of the database servers 104 including, for example, the library database 202.

The compilation network 100 can include a user interface 306 that communicates information to, and receives inputs from the user. In some embodiments, the user interface 306 can include one or several sensors configured to sense a physical result of one or several user actions, and to convert this sensed result into an electric signal. In some embodiments, the one or several sensors can be configured to sense pressure and/or pressures such as, for example, one or several pressures exceeding a threshold value, and can include, for example, a keyboard, a touchscreen, a mouse, or the like. In some embodiments, the one or several sensors can be configured to sense sound and/or pressure waves, and can include, for example, one or several microphones. The user interface 306 can also include one or several features configured to output information to a user in a human-consumable format, and particularly to transform one or several electrical signals into a human-consumable format. These one or several features can include, for example, a screen, a speaker, a monitor, or the like.

The compilation engine 100 can include a rights engine 308. The rights engine 308 can be configured to determine whether the compilation and/or the media components of the compilation comply with license requirements and/or bring the compilation and/or the media components of the compilation into compliance with license requirements. In some embodiments, for example, the rights engine 308 can be configured to receive information identifying the one or several media components selected for use in the compilation and for retrieving license information relating to those media components from one of the database servers 104 including, for example, the library database 202 and/or the license database 206. in some embodiments, the rights engine 308 can be further configured to retrieve information relating to the intended distribution of the compilation and/or the end-use of the compilation, relating to the use of the media components within the compilation, and/or the like, and determine whether the details of the intended end-use of the compilation and the use of the media components within the compilation comply with license conditions for the media components. In some embodiments, if the database servers 104 do not include license information for the media components and/or if the details of the intended end-use of the compilation and of the media components within the compilation do not comply with license terms or conditions for the media components, then the rights engine 308 can be configured to communicate with one of the remote servers 108 such as, for example, the content server 108-A and/or the user server 108-B to acquire license rights for the compilation and/or for the use of the media component within the compilation. If it is determined that license rights cannot be attained, in some embodiments, the rights engine 308 can query the content engine 304 for the identification of other media components having similar attributes such as, for example, similar subject matter and/or similar skill level. In some embodiments, if alternative media components are identified, then the rights engine 308 can provide information relating to the alternative media components to the user interface 306 which can then provide information relating to the alternative media components to the user. In some embodiments, for example, the user can then, via the user interface 306, provide an input indicating whether to select one or several of the original media components and/or to select one or several of the alternative media components.

In some embodiments, the rights engine 308 can be configured to receive a license from the user. In some embodiments, for example in which the user creates a new compilation via the creation engine 302 or in which the user creates new content, the rights engine 308 can be configured to request and/or attain license information relating to the compilation from the user. In some embodiments, for example, this information can include information indicating terms and conditions for use of the compilation. In some embodiments, this information can be stored within, for example, the library database 202 and/or license database 206.

The compilation network 100 can include a payment engine 310. The payment engine 310 can be configured to transact payment and/or to conclude transactions relating to the use of the compilation network 100 and/or relating to the purchase of one or several media components or compilations. In some embodiments, the payment engine 310 can be configured to interact with one or several consideration servers 108-C to transact these payments and/or to conclude these transactions. Additionally, in some embodiments, the payment engine 310 can be configured to receive information relating to the selected one or several media components for inclusion within the compilation. This information can include attributes of the media components including, for example, one or several price attributes. In some embodiments, the payment engine 310 can determine the compilation price resulting from the use of the one or several media components in the compilation and/or can determine the price of the selected media component. In some embodiments, the payment engine 310 can query the content engine 304 for alternative media components having similar attributes such as, for example, similar subject matter and/or similar skill level. In some embodiments, the payment engine 310 can retrieve price attribute information for the alternative media components and can determine the relative impact on the cost of the compilation and/or the cost for use of the media component resulting from the use of one or several of the media components and/or one or several of the alternative media components. In some embodiments, if one or several of the alternative media components result in a desired relative price with respect to one or several selected media components, then the payment engine 310 can provide information relating to the alternative media components of the user interface 306, which can then provide information relating to the alternative media components to the user. In some embodiments, for example, the user can then, via the user interface 306, provide an input indicating whether to select one or several of the original media components and/or to select one or several of the alternative media components.

The compilation network 100 can include an evaluation engine 312. The evaluation engine 312 can be configured to receive information from the user devices 106 and to analyze this received information. In some embodiments, this information can be used to describe the effectiveness of the media component, the appropriateness of the use of the media component with, for example, a subject matter, an age group, a skill level, or the like. In some embodiments, the evaluation engine 312 can provide updates to the content engine 304 with the attributes of one or several of the media components within the content engine 304.

Figure 4:
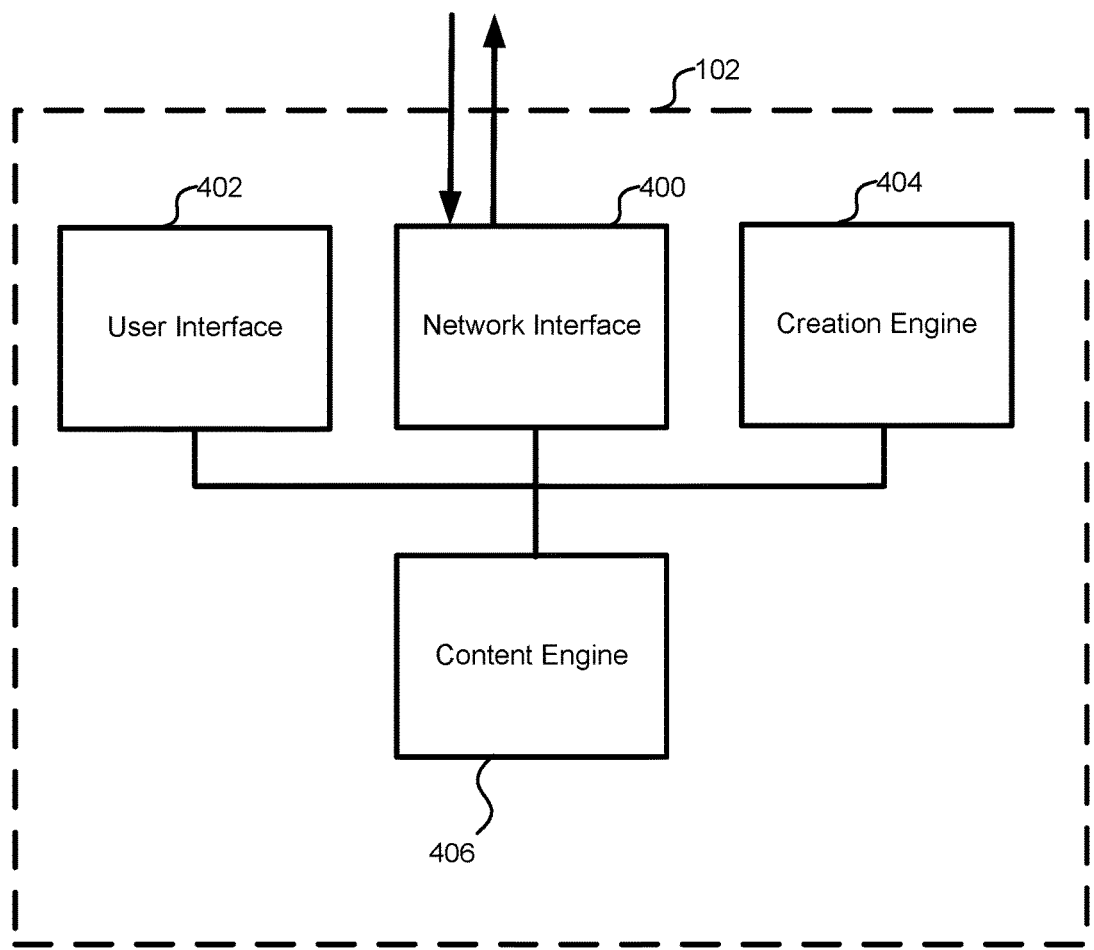
FIG. 4 is a functional schematic illustration of one embodiment of the central server of one embodiment of the compilation network.

With reference now to FIG. 4, a functional block diagram of one embodiment of the central server 102 is shown. The central server 102 can include a variety of components. These components can, as described with respect to FIG. 4, be distinct form components of the compilation network 100, and in some embodiments, these components can be some or all of the components of the compilation network 100 discussed in FIG. 3.

The central server 102 can include a network interface 400. The network interface 200 can allow components of the compilation system 100 to communicate with each other and with outside remote servers 108. In some embodiments, the network interface 400 can be configured to access the network 100. The network interface 400 can include features configured to send and receive information, including, for example, an antenna, a modem, a transmitter, receiver, or any other feature that can send and receive information. The network interface 400 can communicate via telephone, cable, fiber-optic, or any other wired communication network. In some embodiments, the network interface 400 can communicate via cellular networks, WLAN networks, or any other wireless network.

The central server 102 includes a user interface 402 that communicates information to, and receives inputs from the user. In some embodiments, the user interface 402 can include one or several sensors configured to sense a physical result of one or several user actions, and to convert this sensed result into an electric signal. In some embodiments, the one or several sensors can be configured to sense pressure and/or pressures such as, for example, one or several pressures exceeding a threshold value, and can include, for example, a keyboard, a touchscreen, a mouse, or the like. In some embodiments, the one or several sensors can be configured to sense sound and/or pressure waves, and can include, for example, one or several microphones. The user interface 402 can also include one or several features configured to output information to a user in a human-consumable format, and particularly to transform one or several electrical signals into a human-consumable format. These one or several features can include, for example, a screen, a speaker, a monitor, or the like.

The central server 102 can include a creation engine 404 that can include features and/or components that are configured and/or can be used by the user in the creation of a compilation and/or of a user generated media component, also referred to herein as user generated content. In some embodiments, this can include a user interface including tools, functions, and capabilities that can allow a user to search the database servers 104 including, for example, the library database 202, for one or several media components. In some embodiments, the creation engine 404 can include functionality configured to allow the combination of one or several media components, the manipulation of one or several media components, the creation of user generated content, the searching of outside sources 108 such as, for example, the content server 108-A for content not contained within the library database 202, or the like.

In some embodiments, the central server 102 can include a content engine 406 that can be configured to receive the user-selected one or several media components, to retrieve information identifying attributes of the one or several media components including, for example, the subject matter and/or skill level of the one or several media components, and to identify other media components having similar attributes. In some embodiments, the content engine 304 can be further configured to retrieve information identifying one or several rating attributes including, for example, data indicating the effectiveness of the selected one or several media components in facilitating attainment of a desired outcome. In some embodiments, for example, information retrieved by content engine 406 can be retrieved from one of the database servers 104 including, for example, the library database 202.

Figure 5:
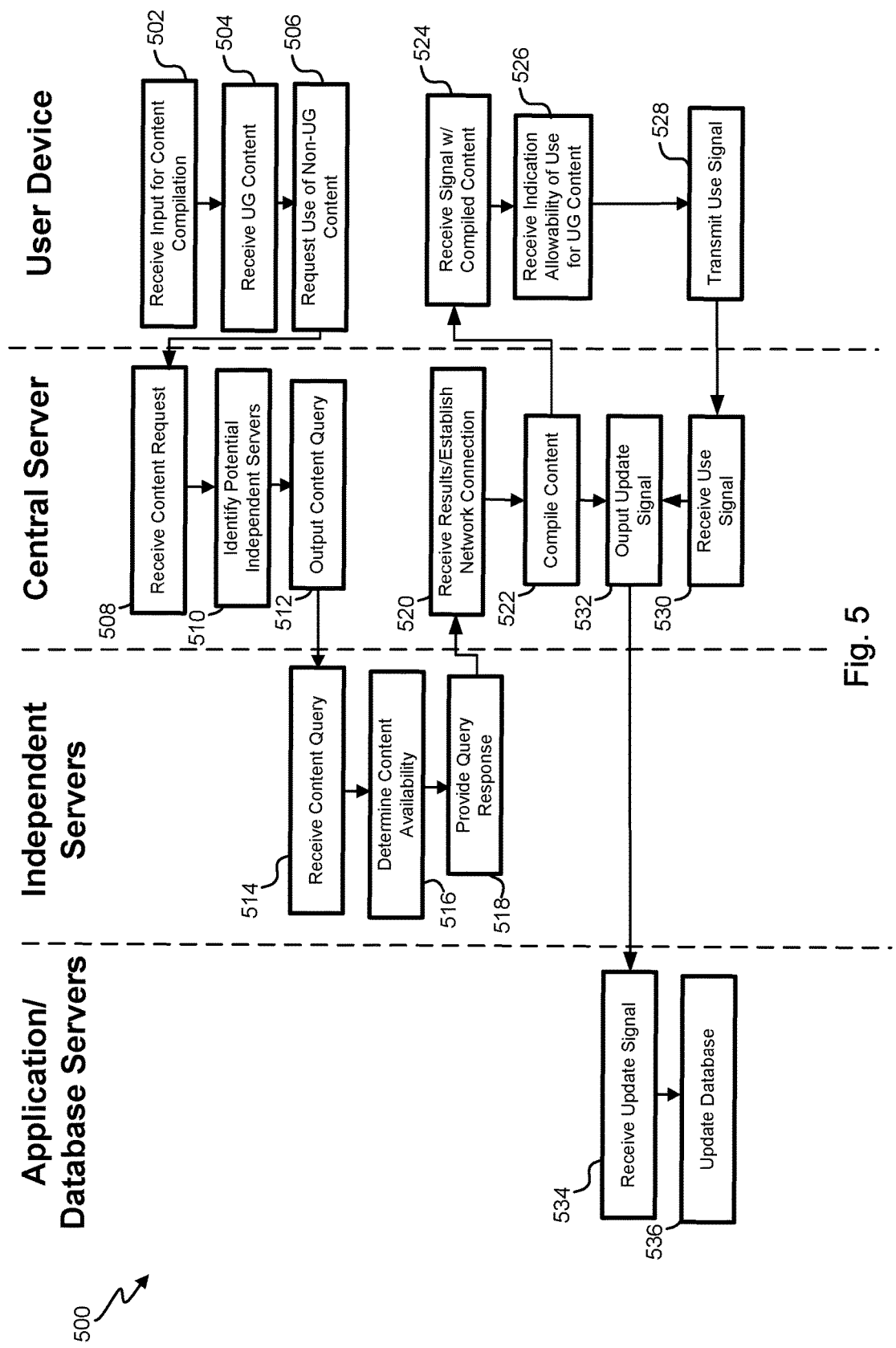
FIG. 5 is a swim-lane diagram illustrating one embodiment of a process for creating the compilation network.

With reference now to FIG. 5, a swim-lane diagram illustrating one embodiment of a process 500 for generating a compilation network 100 and/or for generating a compilation is shown. The process begins a block 502, wherein a user input is received at the user device 106. In some embodiments, this input can comprise a request and/or command for the creation of a compilation. After the input has been received, the process 500 proceeds to block 504, wherein user generated (UG) content is received and/or created. In some embodiments, the UG content can be generated with one or both of the creation engines 302, 404 that can be, for example, accessed with the user device 106. In some embodiments, UG content can be retrieved from the user device, and/or retrieved from the database server 104.

After the UG content has been received, the process 500 proceeds to block 506, wherein the user device 106 requests use of and access to non-UG content. This request can comprise the generation of an electric signal, and the outputting of this electric signal from the user device 106 to the central server 102 via the network 110.

After the central server receives the non-UG content request at block 508, the process 500 proceeds to block 510, wherein independent servers 108 that potentially contain the non-UG content are identified. In some embodiments, for example, a central server 102 may be connected to one or several content servers 108-A, user servers 108-B, and/or consideration servers 108-C. As each of these servers may contain different information, a subset of the total number of remote servers 108 is identified, the remote servers 108 of which subset possibly contain at least one of the content or information relating to the content. In some embodiments, information relating to the content can include one or both of use information and consideration information.

In some embodiments, the subset of the remote servers 108 can be identified based on information relating to the content such as, for example, information relating to the source of the content, the content author, publication dates, or the like. This information can be compared to information stored in one of the databases of the database server 104 such as, for example, the library database 202 to identify remote servers 108 that might contain the content and/or information relating to the content.

After the remote servers 108 are identified that might contain the content and/or information relating to the content, the process 500 proceeds to block 512, wherein the central server 102 generates a content query and outputs the content query via an electric signal to the subset of remote servers 108 and/or to all of the remote servers 108. In some embodiments, this content query comprises identification of the content and a request for an indication whether the remote server 108 receiving the request (the recipient remote server 108) contains the content and/or information relating to the content, and/or a request to provide any of the identified content and/or information relating to the identified content contained by the recipient remote server 108.

After the outputting of the content query, the process 500 proceeds to block 514, wherein the content query is received by the remote servers 108 in the subset. After the content query is received, the process 500 proceeds to block 516, wherein the availability of the content and/or information relating to the content is determined. In some embodiments, this can include the querying of one or several databases associated with the remote servers 108 for this information. After the availability of the content is determined, the process 500 proceeds to block 518, wherein a query response is generated and provided. In some embodiments, the query response can indicate whether the recipient remote server 108 contains the content and/or information relating to the content, and in some embodiments, the response can include the content and/or information relating to the content. In some embodiments, the response can be an electrical signal that can be transmitted from one or several of the remote servers 108 to the central server 102.

After the query response has been provided, the process 500 proceeds to block 520, wherein the query responses are received, a network connection is established, and/or the content and/or information relating to the content is received. After the query responses have been received, the process 500 proceeds to block 522, wherein the content is compiled, which content can include UG content and/or non-UG content. In some embodiments, this can include the placement of one or several of the pieces of content into a single compilation, and can specifically include, for example, the creation of a document, a book, an e-book, or the like from the one or several pieces of content.

After the content has been compiled, the process 500 proceeds to block 524, wherein the compiled content is received at the user device 106. In some embodiments, the compiled content can be received in the form of one or several electric signals that contain the compilation. After the compilation has been received, the process 500 proceeds to block 526, wherein an indication of allowability of use of any UG content is received. In some embodiments, for example, UG content can optionally be stored in one of the databases of the database server 108 including, for example, the library database 202, and the UG content can be accessed and/or used by other users of the compilation network 100. In such an embodiment, terms of use and/or consideration requirements for use of the UG content can be received from the user and can be stored, for example, in one of the databases of the database server 108 such as, for example, the library database 202 and/or the license database 206.

After the indication of allowability of use for any UG content has been received, the process 500 proceeds to block 528, wherein a signal identifying terms of use and/or consideration requirements for use of any UG content are transmitted from the user device 106 to the central server, which signals are received in block 530.

After the database server 104 has been updated with respect to any UG content, or simultaneously with or alternatively to the steps of blocks 524 to 528, after the content has been compiled in block 522, the process 500 proceeds to block 532, wherein an update signal is output. In some embodiments, this update signal can be used to update one or both of the library database 202 and/or the license database 206 with information relating to terms of use and/or consideration requirement for use of the UG content. In some embodiments, this update can include the outputting of one or several electric signals from the central server 102 to the database server 104, and particularly to one of the databases of the database server 104.

After the update signal has been generated and sent, the process 500 proceeds to block 534, wherein the update signal is received by the database server 104, and then proceeds to block 536, wherein one or several of the databases of the database server 104 are updated according to the received update signal.

Figure 6:
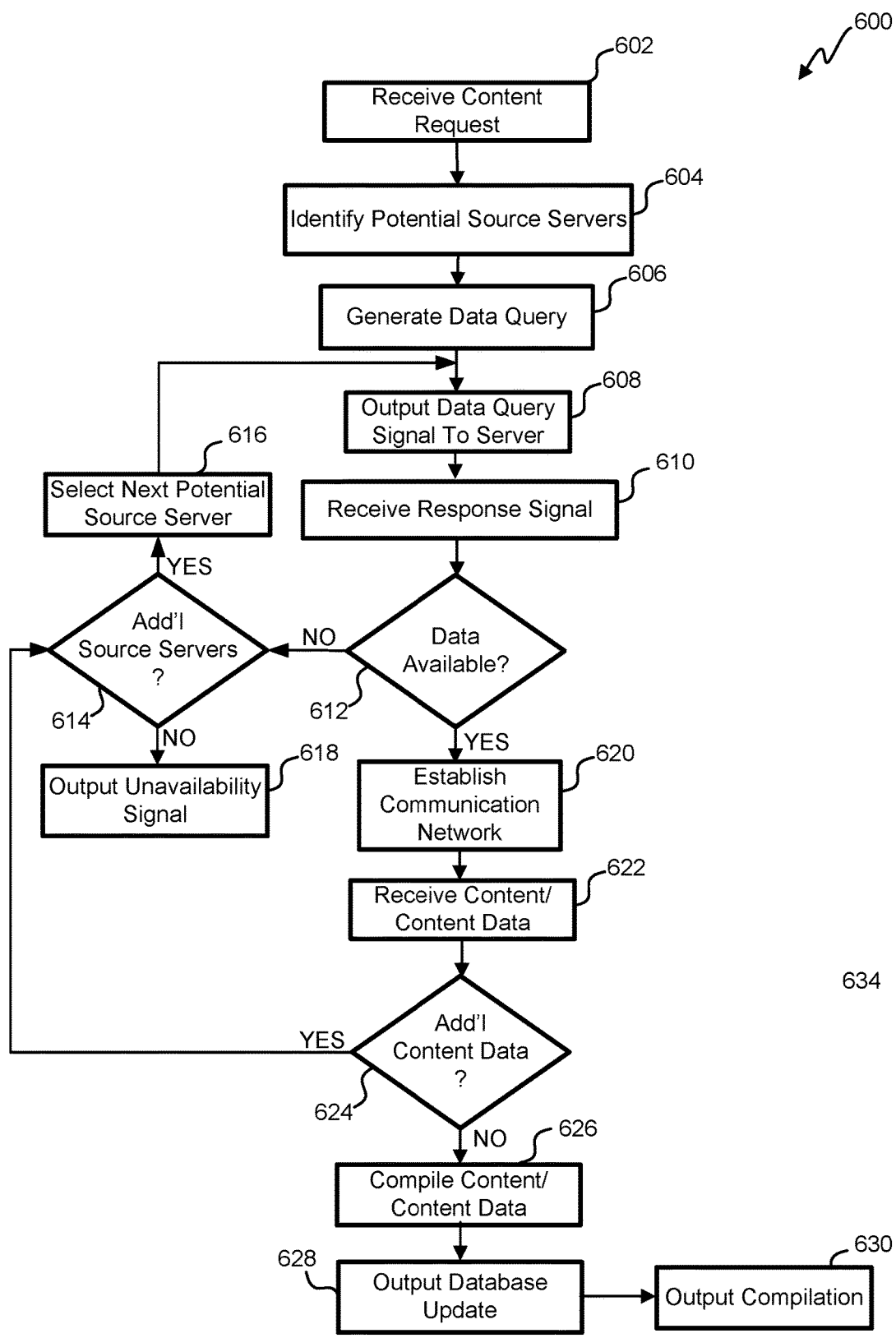
FIG. 6 is a flowchart illustrating one embodiment of a process for creating a compilation via the creation of the compilation network.

With reference now to FIG. 6, a flowchart illustrating one embodiment of a process 600 for creation of a compilation network 100 is shown. The process 600 can be performed by the central server 102 and/or other components of the compilation network 100. The process 600 begins at block 602, wherein a content request is received, and in some embodiments, received by the central server 102. In some embodiments, the receipt of the content request can be the result of the performance of steps 502 to 506 by the user device 106 as shown in FIG. 5. After the content request is received, the process 600 proceeds to block 604, wherein independent servers 108 that potentially contain the requested content are identified. As discussed above, this can be performed by identifying one or several of the remote servers 108 that contain and/or may contain the content and/or information relating to the content.

After the independent servers 108 that potentially contain the requested content are identified, the process 600 proceeds to block 606, wherein a data query, also referred to herein as the content query, is generated. In some embodiments, this content query includes identification of the requested content and a request for an indication of whether the remote server 108 receiving the request (the recipient remote server 108) contains the content and/or information relating to the content, and/or a request to provide any of the identified content and/or information relating to the identified content contained by the recipient remote server 108. After the data query is generated, the process 600 proceeds to block 608, wherein the data query is outputted in the form of an electric signal from the central server 102 to one or several of the remote servers 108.

After the data query is output, the process 600 proceeds to block 610, wherein a response signal is received by the central server 102. In some embodiments, the response signal can respond to the data query of block 608, and can include information indicating whether one or several of the recipient servers 108 contain the requested content and/or information relating to the requested content. In some embodiments, the receipt of the response signal in block 610 can comprise receiving a signal from one of the recipient remote servers 108, and in some embodiments, the receipt of the response signal in block 610 can comprise one or several response signals from and/or relating to some or all of the recipient remote servers 108.

After the response signal has been received, the process 600 proceeds to decision state 612, wherein it is determined it is determined if the response signal contains the requested content and/or information related to the requested content, and/or identifies one of the recipient servers 108 as containing the requested content and/or information relating to the requested content.

If it is determined that he the response signal does not contain the requested content and/or information related to the requested content, and/or does not identify one of the recipient servers 108 as containing the requested content and/or information relating to the requested content, then the process 600 proceeds to decision state 614, wherein it is determined if there are additional remote servers 108 from which a response signal has not been received and/or additional remote servers 108 that were not recipient remote servers 108. In some embodiments, this determination can include retrieving data identifying all of the remote servers 108, retrieving data identifying the recipient servers 108 and/or the remote servers 108 in the subset, and comparing the data identifying all of the remote servers 108 to data identifying the recipient servers 108 and/or the remote servers 108 in the subset. In some embodiments, this comparison can be performed according to a Boolean function, wherein, a first, "true," value can be associated with a remote server 108 that was not a recipient remote server 108 and/or was not in the subset, and a second, "false," value can be associated with a remote server 108 that was a recipient remote server 108 and/or was in the subset.

If it is determined that there are additional remote servers 108, then the process 600 proceeds to block 616, wherein a next potential remote server 108 is identified and/or a next potential group of remote servers 108 is identified. In some embodiments, these one or several potential remote servers 108 can be identified from the group of remote servers that are associated with the first Boolean value. After these one or several additional potential remote servers 108 are identified, the process 600 returns to block 608 and proceeds as outlined above. Returning again to decision state 614, if it is determined that there are no additional remote servers 108, then the process 600 proceeds to block 618, wherein a signal indicative of the unavailability of the requested content is outputted from the central server 102 to, for example, the user device 106.

Returning again to decision state 612, if it is determined that one or several of the recipient servers 108 contains the requested content and/or information relating to the requested content, the process 600 proceeds to block 620, wherein a communication network is established. In some embodiments, the communication network can be established by the exchange of one or several signals containing data packets. After the communication network has been established, the process 600 proceeds to block 622, wherein the requested content and/or information relating to the requested content is received. In some embodiments, this requested content and/or information relating to the requested content can be received via one or several signals at the central server 102, which signals can contain data packets that can contain, for example, the requested content and/or information relating to the requested content.

After the requested content and/or information relating to the requested content has been received, the process 622 proceeds to decision state 624, wherein it is determined if there is additional data, including additional requested content and/or information relating to the requested content. In some embodiments, this can include determining if all of the data for responding to the content request has been received or if additional data is needed to respond to the content request. If it is determined that additional data is needed, then the process returns to decision state 614, and proceeds as outlined above.

If it is determined that there is no additional needed data, then the process 600 proceeds to block 626, wherein the received, requested content and/or information relating to the received, requested content is compiled. In some embodiments, this can include fixing of the received, requested content and/or information relating to the received, requested content into the compilation. This can include, for example, formatting the received, requested content and/or information relating to the received, requested content and/or ordering the received, requested content and/or information relating to the received, requested content as prescribed by the user via the creation engine 302.

After the received, requested content and/or information relating to the received, requested content has been compiled, the process 600 proceeds to block 628, wherein the compilation is outputted to the database server 104, and particularly to one of the databases of the database server 104 such as, for example, the library database 202. After the compilation has been outputted to the database server 104, the process 600 proceeds to block 630, wherein the compilation is outputted to the user device 106, which can be, for example, the user device 106 from which the content request originated. In some embodiments, this can include generating a signal containing the compilation, and sending the signal containing the compilation to the user device 106.

Figure 7:
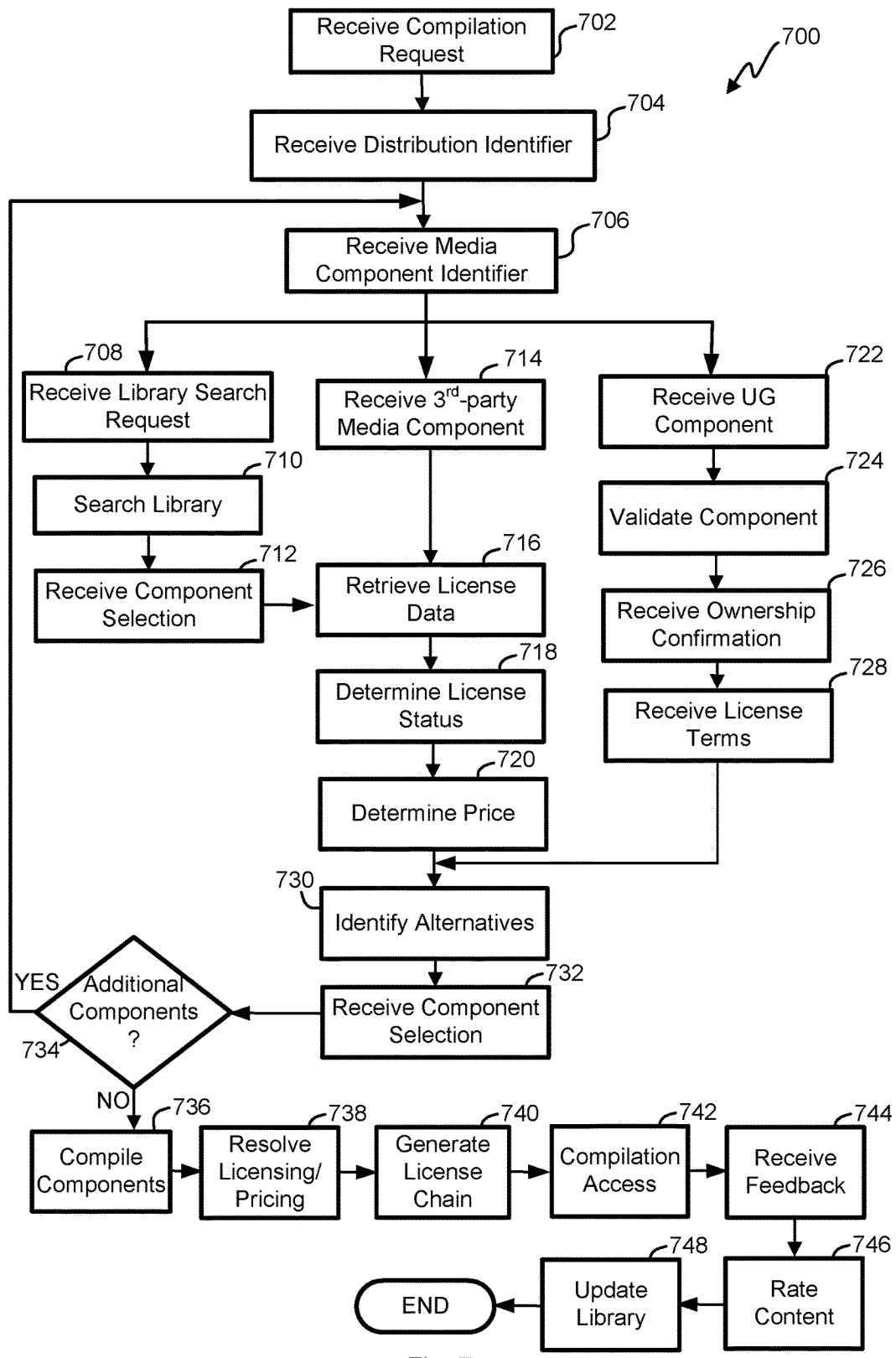
FIG. 7 is a flowchart illustrating one embodiment of a process for generating a compilation.

With reference now to FIG. 7, a flowchart illustrating one embodiment of a process 700 for generation of a chain of license is shown. In some embodiments, the chain of license can identify the rights associated with a compilation including, for example, ownership of and/or conditions of use of the entire compilation, ownership of and/or conditions of use of the media components of the compilation, ownership of and/or conditions of use of any portions of the media components, or the like. In some embodiments, the process 700 can be performed by the compilation network 100 and/or by a component thereof including, for example, the central server 102 and/or one of the user devices 106.

The process 700 begins at block 702 wherein the compilation request is received. In some embodiments, the compilation request can be received via, for example, the user interface 306. The compilation request can be received from the user and can initiate user interaction with the compilation network 100. In some embodiments, the compilation request can indicate an intent to create a compilation, to modify and/or manipulate one or several media components, and/or to create user generated content.

After the compilation request has been received, the process 700 proceeds to block 704 wherein a distribution identifier is received. In some embodiments, the distribution identifier can be received by the user interface 306 and can include information identifying attributes of the intended distribution of the compilation. In some embodiments, for example, these attributes of the intended distribution can identify, for example, the intended format of distribution such as, for example, distribution of a printed medium and/or distribution of an electronic medium, the degree of expected distribution of the compilation such as, for example, the anticipated number of distributed copies of compilation, and any restrictions on distribution such as, for example, intended limitations on the transferability of the compilation, intended security features on electronic version of the compilation, and/or intended limitations on the time period during which the compilation is accessible. In some embodiments, the distribution identifier can be stored in, for example, the creation database 104-E.

After the distribution identifier has been received, the process 700 proceeds to block 706 wherein a media component identifier is received. In some embodiments, the media component identifier identifies a user-desired type of media component. In some embodiments, the media component identifier can identify a media component stored within the library database 104-A, a third party material not stored within the library database 104-A, or a user generated media component.

After the search request has been received, the process 700 proceeds to one of blocks 708, 714, or 722 depending on the type of media component identified by the media component identifier. In embodiments in which media components stored within the library database 104-A are identified, the process 700 proceeds to block 708 wherein a library search request is received. In some embodiments, the search request can be received by the user interface 306 and can correspond to a requested search of, for example, materials within the library database 104-A. In some embodiments, this search can be performed using keywords identifying attributes of the desired material such as, for example, the desired subject matter and/or skill level of the desired material.

After the search request has been received, the process 700 proceeds to block 710 wherein the library database 104-A is searched. In some embodiments, the search can be performed using a search engine and/or using one or several search algorithms. In some embodiments, the search results can be provided to the user via, for example, the user interface 306. After the library search has been performed, process 700 proceeds to block 712 wherein media component selection is received. In some embodiments, media component selection can comprise the identification of one or several media components by the user for use in the compilation. In some embodiments, the media component selection can be made via the user interface 306, and results of the media selection can be stored within, for example, the creation database 104-E.

Returning again to block 706, if the received media component identifier identifies third party material not stored within the library database 104-A, the process 700 proceeds to block 714 wherein the third party media component is received. In some embodiments, this step can include, for example, utilizing the creation engine 302 and/or the content engine 304 to search for desired third party material. In some embodiments, this search can be performed within the World Wide Web.

In some embodiments, the step in block 714 can further include displaying the results of the search to the user via, for example, the user interface 306 and receiving identification of desired third party media components from the user via the user interface 306. In some embodiments, for example, third party material can be stored within one of the database servers 104 including, for example, the creation database 104-E.

After the third party media component has been received, or alternatively, after the component selection has been received in block 712, the process 700 proceeds to block 716 wherein license data is retrieved. In some embodiments, for example, the license data can be retrieved from one of the database servers 104 including, for example, the library database 104-A and/or the license database 104-C. In some embodiments, the licensed data can identify terms and conditions for use of and/or distribution of the media component, and in some embodiments, the licensed data can identify the owner of rights associated with the media component and/or sources of receiving rights to use and/or distribute the selected media component.

After the licensed data has been retrieved, the process 700 proceeds to block 718 wherein the license status is determined. In some embodiments, the determination of the license status can include determining whether there are terms and/or conditions under which the selected media component can be used and/or distributed, and whether there are known terms and/or conditions under which the selected media component can be used and/or distributed. In some embodiments, the determination of the license status can include determining whether the provided distribution attributes correspond to terms and conditions of the license. In some embodiments, this determination can be made by the central server 102, the user device 106, and/or the rights engine 308.

After the license status has been determined, the process 700 proceeds to block 720 wherein the price determined. In some embodiments, the determination of the price can include the retrieval of one or several price attributes from the library database 104-A and/or the pricing database 104-B. In some embodiments the determined price can be the price of, for example, one or more of the media components and/or the price of the compilation that would result from the combination of the selected media components. In some embodiments, the price can be determined by the central server 102, the user device 106, and/or the payment engine 312.

Returning again to block 706, if the received media component identifier identifies a selection to use user generated content, then the process 700 proceeds to block 722 wherein the user generated content in the form of a user generated media component is received. In some embodiments, the user generated content can be received from the creation engine 302 and/or from an outside source 108 such as the material source 108-A via, for example, the network interface 300.

After the user generated component has been received, the process 700 proceeds to block 724 wherein the user generated component is validated. In some embodiments, the validation of the user generated component is performed by the creation engine 302 and/or the content engine 304. In some embodiments, the validation of the user generated component can include, for example, an evaluation of the subject matter of the user generated content, an evaluation of the skill level embodied by the user generated content, a validation of the accuracy of the user generated content, an originality evaluation to prevent plagiarism, and the like. After the user generated content has been validated, the process 700 proceeds to block 726 wherein ownership confirmation is received. In some embodiments, ownership confirmation can be received from the user via one or several user inputs to the user interface 306. In one embodiment, for example, the user can indicate that they are the owner of rights associated with the user generated content and/or are the author or creator of the user generated content. In some embodiments, this assertion of ownership can be associated with the user generated content and can be, for example, stored within the creation database 104-E and/or the library database 104-A.

After the ownership confirmation has been received, the process 700 proceeds to block 728 wherein license terms are received. In some embodiments, for example, the user can allow other users to access his user generated content. In such an embodiment, the user can place limitations on the circumstances in which other users can access his user generated content. These limitations can include, for example, limitations on the end-use of his content, the distribution of his content, or any other desired limitation. In some embodiments, the user can provide information to the compilation network 100 relating to terms and/or conditions under which the use and/or distribution of the user's generated content is acceptable. In some embodiments, for example, the user may allow use and/or distribution of his generated content subject to no terms and conditions or subject to some terms and conditions. In some embodiments, the user can select a license, from, for example, a menu of license options, under which his user generated content is accessible, and in some embodiments, the user can provide the specific terms and conditions under which his user generated content is accessible to the compilation network 100 via, for example, the user interface 306.

After license terms have been received, the process 700 proceeds to block 730 wherein one or several alternative media components are identified. In some embodiments, for example, the compilation network 100 can use attributes of the originally selected media component to identify one or several alternative media components having similar attributes. In some embodiments, for example, these one or several alternative media components can relate the same subject matter, the same skill level, the same search terms, and/or any other desired commonality. In some embodiments, the compilation network 100 can evaluate the alternative media components for less restrictive and/or more favorable licensing terms, or for a different price. In one embodiment, for example, the compilation network 100 can identify alternative media components having more favorable licensing conditions and/or that are more cheaply available.

After alternative media components have been identified, the process 700 proceeds to block 733 wherein a final media component selection is received. In some embodiments, this final media component selection can be the selection by the user of one or several of the originally selected media components and/or of one or several of the alternative media components. In some embodiments, the selection can be made via the user interface 306 of the compilation network 100.

After the media component selection has been received, the process 700 proceeds to decision state 734 wherein it is determined if additional media components will be used in the creation of the compilation. In some embodiments, this can include providing the user a prompt via the user interface 306 to indicate whether the user is done selecting media components, and receiving a user input indicating whether the user wants to include additional media components. If it is determined that the user desires to include additional media components within the compilation, then the process 700 returns to block 706 and continues as outlined above.

Returning again to decision state 734, if it is determined that the user does not desire to include additional media components within the compilation, the process 700 proceeds to block 736 wherein the media components are compiled. In some embodiments, the compiling of the media components can include the fixing of the media components into the compilation. This can include, for example, formatting the media components and/or ordering the media components as prescribed by the user via the creation engine 302. After the components have been compiled, the process 700 proceeds to block 738 wherein licensing and/or pricing for the compilation is resolved. In some embodiments, the resolution of the licensing and/or pricing can include a final determination of whether the compilation and the intended distribution of the compilation complies with the terms and conditions of the licenses of the media components, and can include determining the price associated with use of the media components within the compilation and the overall price of the compilation. In some embodiments, this resolution can be performed by the rights engine 308, by the payment engine 310, and/or by any other component or functional component of the compilation network 100.

After the licensing and/or pricing has been resolved, the process 700 proceeds to block 740 wherein a license chain is generated, also referred to herein as the chain of license. In some embodiments, for example, and as mentioned above, the chain of license can include information identifying one or several licenses applicable to the compilation, to the media components within the compilation, and/or to any subcomponents of the media components. In some embodiments, the chain of license can be generated by the central server 102, the user device 106, the rights engine 308, and/or any other component or functional component of the compilation network 100. In some embodiments, the chain of license can be stored within one of the database servers 104 such as, for example, the library database 104-A or the license database 104-C.

After the chain of license has been generated, the process 700 proceeds to block 742 wherein access to the compilation is provided. In some embodiments, this can correspond to, for example, providing material to a printer for printing of the compilation, providing electronic content to a user, providing access to electronic content, or the like. After compilation access has been provided, the process proceeds to block 744 wherein feedback is received. In some embodiments, feedback can be received via one of the user devices 106 and can identify the effectiveness of the compilation and/or of the media components of the compilation in achieving a desired goal. In some embodiments, the feedback can be based on provided student evaluations of the compilation and/or the content thereof, and in some embodiments, the feedback can be based on student performance on tasks relating to the compilation.

After the feedback has been received, the process 700 proceeds to block 746 wherein the content is rated. In some embodiments, the content can be rated according to the feedback received in block 744. In some embodiments, this rating can identify the effectiveness of the compilation in facilitating attainment of a desired goal related to the compilation, and in some embodiments, this rating can identify the degree to which students liked or disliked the compilation. In some embodiments, for example, the rating of the compilation and/or the components thereof can be performed by the evaluation engine 312.

After the compilation has been rated, the process 700 proceeds to block 748 wherein the library is updated. In some embodiments, for example, the updated library can comprise the update of one or several of the database servers 104 including, for example, the library database 104-A, the evaluation database 104-D, and/or the creation database 104-E with information relating to the new compilation and/or the media components of the new compilation. In some embodiments, the library can be updated so as to associate the rating with the compilation giving rise to the rating.

Figure 8:
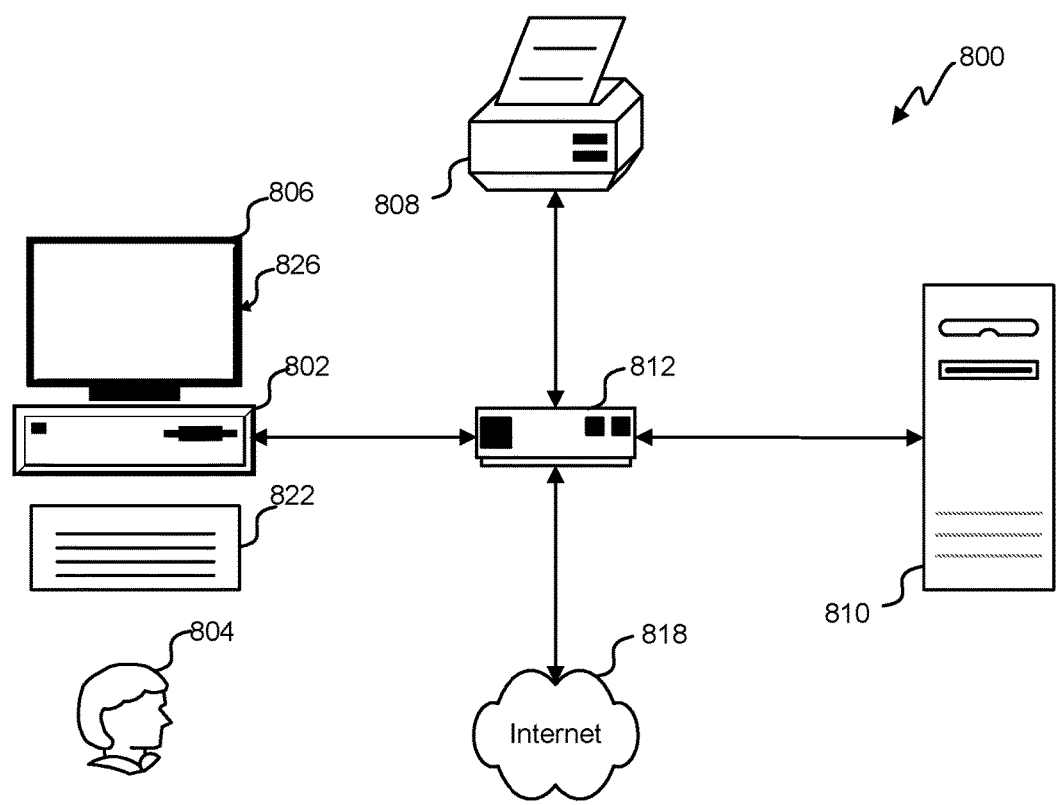
FIG. 8 is a block diagram of an embodiment of a computer system.

With reference now to FIG. 8, an exemplary environment with which embodiments may be implemented is shown with a computer system 800 that can be used by a user 804 as all or a component of a compilation network 100. The computer system 800 can include a computer 802, keyboard 822, a network router 812, a printer 808, and a monitor 806. The monitor 806, processor 802 and keyboard 822 are part of a computer system 826, which can be a laptop computer, desktop computer, handheld computer, mainframe computer, etc. The monitor 806 can be a CRT, flat screen, etc.

A user 804 can input commands into the computer 802 using various input devices, such as a mouse, keyboard 822, track ball, touch screen, etc. If the computer system 800 comprises a mainframe, a designer 804 can access the computer 802 using, for example, a terminal or terminal interface. Additionally, the computer system 826 may be connected to a printer 808 and a server 810 using a network router 812, which may connect to the Internet 818 or a WAN.

The server 810 may, for example, be used to store additional software programs and data. In one embodiment, software implementing the systems and methods described herein can be stored on a storage medium in the server 810. Thus, the software can be run from the storage medium in the server 810. In another embodiment, software implementing the systems and methods described herein can be stored on a storage medium in the computer 802. Thus, the software can be run from the storage medium in the computer system 826. Therefore, in this embodiment, the software can be used whether or not computer 802 is connected to network router 812. Printer 808 may be connected directly to computer 802, in which case, the computer system 826 can print whether or not it is connected to network router 812.

Figure 9:
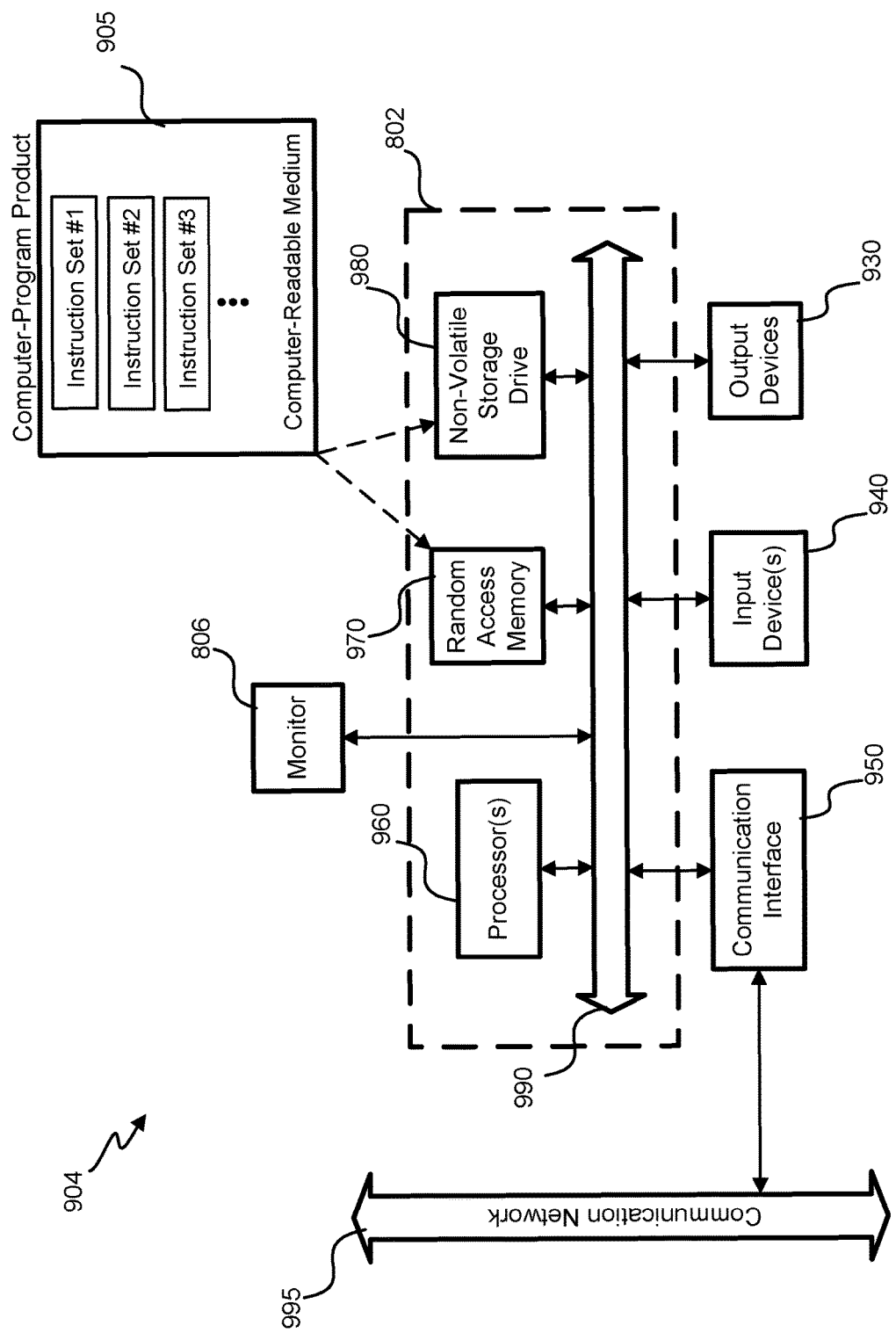
FIG. 9 a block diagram of an embodiment of a special-purpose computer system.

With reference to FIG. 9, an embodiment of a special-purpose computer system 904 is shown. The above methods may be implemented by computer-program products that direct a computer system to perform the actions of the above-described methods and components. Each such computer-program product may comprise sets of instructions (codes) embodied on a computer-readable medium that direct the processor of a computer system to perform corresponding actions. The instructions may be configured to run in sequential order, or in parallel (such as under different processing threads), or in a combination thereof. After loading the computer-program products on a general purpose computer system 826, it is transformed into the special-purpose computer system 904.

Special-purpose computer system 904 comprises a computer 802, a monitor 806 coupled to computer 802, one or more additional user output devices 930 (optional) coupled to computer 802, one or more user input devices 980 (e.g., keyboard, mouse, track ball, touch screen) coupled to computer 802, an optional communications interface 950 coupled to computer 802, a computer-program product 905 stored in a tangible computer-readable memory in computer 802. Computer-program product 905 directs system 904 to perform the above-described methods. Computer 802 may include one or more processors 960 that communicate with a number of peripheral devices via a bus subsystem 990. These peripheral devices may include user output device(s) 930, user input device(s) 940, communications interface 950, and a storage subsystem, such as random access memory (RAM) 970 and non-volatile storage drive 980 (e.g., disk drive, optical drive, solid state drive), which are forms of tangible computer-readable memory.

Computer-program product 905 may be stored in non-volatile storage drive 980 or another computer-readable medium accessible to computer 802 and loaded into memory 970. Each processor 960 may comprise a microprocessor, such as a microprocessor from Intel® or Advanced Micro Devices, Inc.®, or the like. To support computer-program product 905, the computer 802 runs an operating system that handles the communications of product 905 with the above-noted components, as well as the communications between the above-noted components in support of the computer-program product 905. Exemplary operating systems include Windows® or the like from Microsoft® Corporation, Solaris® from Oracle®, LINUX, UNIX, and the like.

User input devices 940 include all possible types of devices and mechanisms to input information to computer system 802. These may include a keyboard, a keypad, a mouse, a scanner, a digital drawing pad, a touch screen incorporated into the display, audio input devices such as voice recognition systems, microphones, and other types of input devices. In various embodiments, user input devices 940 are typically embodied as a computer mouse, a trackball, a track pad, a joystick, wireless remote, a drawing tablet, a voice command system. User input devices 940 typically allow a user to select objects, icons, text and the like that appear on the monitor 806 via a command such as a click of a button or the like. User output devices 930 include all possible types of devices and mechanisms to output information from computer 802. These may include a display (e.g., monitor 806), printers, non-visual displays such as audio output devices, etc.

Communications interface 950 provides an interface to other communication networks 995 and devices and may serve as an interface to receive data from and transmit data to other systems, WANs and/or the Internet 818. Embodiments of communications interface 950 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 950 may be coupled to a computer network, to a FireWire® bus, or the like. In other embodiments, communications interface 950 may be physically integrated on the motherboard of computer 802, and/or may be a software program, or the like.

RAM 970 and non-volatile storage drive 980 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 970 and non-volatile storage drive 980 may be configured to store the basic programming and data constructs that provide the functionality of various embodiments of the present invention, as described above.

Software instruction sets that provide the functionality of the present invention may be stored in RAM 970 and non-volatile storage drive 980. These instruction sets or code may be executed by the processor(s) 960. RAM 970 and non-volatile storage drive 980 may also provide a repository to store data and data structures used in accordance with the present invention. RAM 970 and non-volatile storage drive 980 may include a number of memories including a main random access memory (RAM) to store of instructions and data during program execution and a read-only memory (ROM) in which fixed instructions are stored. RAM 970 and non-volatile storage drive 980 may include a file storage subsystem providing persistent (non-volatile) storage of program and/or data files. RAM 970 and non-volatile storage drive 980 may also include removable storage systems, such as removable flash memory.

Bus subsystem 990 provides a mechanism to allow the various components and subsystems of computer 802 communicate with each other as intended. Although bus subsystem 990 is shown schematically as a single bus, alternative embodiments of the bus subsystem may utilize multiple busses or communication paths within the computer 802.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A networked system comprising:
   a first memory containing at least one piece of content;
   a first server comprising second memory containing terms of use information of the at least one piece of content contained in the first memory, wherein the first server is configured to:
      extract the terms of use information from the second memory relating to the at least one piece of content;
      determine, from the terms of use information, a limitation on access or use of the at least one piece of content; and
   a central server, wherein the central server is configured to:
      receive a content request for content for distribution to a plurality of student devices, wherein the content request comprises a term of intended use of the content, and wherein the term of intended use of the content is non-compliant with the limitation on access or use of the at least one piece of content stored in the first memory;
      when the term of intended use of the content is non-compliant with the limitation on access or use of the at least one piece of content stored in the first memory, identify alternative content based on a skill level of the requested content, wherein the alternative content is not included in the content request; and
      transmit the alternative content to a teacher device.

2. The system of claim 1, wherein the content request is received from the teacher device, and wherein the second memory comprises: an indication of a context of intended use of the content; and an indication of a quantity of use of the content.

3. The system of claim 2, wherein the alternative content comprises information relating to the alternative content.

4. The system of claim 2, wherein the first memory comprises a database server.

5. The system of claim 2, wherein the central server is configured to receive a query response from the first memory, wherein the query response indicates that the first memory contains the content of the content request.

6. The system of claim 5, wherein the central server is further configured to receive user generated content and to compile the user generated content with at least one of: the requested content, or the alternative content.

7. The system of claim 6, wherein the central server is configured to generate an update signal and send the update signal to the first memory, wherein the update signal comprises the user generated content and at least one term of use.

8. A networked system comprising:
   a first memory containing at least one piece of content;
   a first server comprising second memory containing terms of use information of the at least one piece of content contained in the first memory, wherein the first server is configured to:
      extract the terms of use information from the second memory relating to the at least one piece of content;
      determine, from the terms of use information, a limitation on access or use of the at least one piece of content; and
   a central server, wherein the central server is configured to:
      receive a content request for content for distribution to a plurality of student devices, wherein the content request comprises a term of intended use of the content, and wherein the term of intended use of the content is non-compliant with the limitation on access or use of the at least one piece of content stored in the first memory;
      when the term of intended use of the content is non-compliant with the limitation on access or use of the at least one piece of content stored in the first memory, identify alternative content associated with a skill level of the requested content, wherein the alternative content is not included in the content request; and
      transmit the alternative content to a teacher device.

9. The system of claim 8, wherein the central server is further configured to receive feedback data from a plurality of learner devices, wherein the feedback data is generated based on performance by users of the plurality of learner devices on tasks relating to the alternative content.

10. The system of claim 9, wherein the central server is further configured to generate an effectiveness update based on the received feedback data.

11. The system of claim 10, wherein the central server is further configured update the first memory with the effectiveness update.

12. The system of claim 10, wherein the effectiveness update identifies at an age appropriateness of the alternative content.

13. The system of claim 8, wherein the content request is received from the teacher device, and wherein the second memory comprises: an indication of a context of the intended use of the content; and an indication of a quantity of use of the content.

14. The system of claim 13, wherein the central server is further configured to receive user generated content and to compile the user generated content with at least one of: the requested content, or the alternative content.

15. The system of claim 14, wherein the central server is configured to generate an update signal and send the update signal to the first memory, wherein the update signal comprises the user generated content and at least one term of use.

16. A method for content delivery comprising:
   receiving, with a central server, a content request for content for distribution to a plurality of student devices, wherein the content request comprises terms of use information;
   querying first memory for content corresponding to the content request, wherein the first memory comprises at least one piece of content;

querying a first server comprising the terms of use information for the content corresponding to the content request, wherein the first server is enabled to extract the terms of use information relating to the at least one piece of content;

receiving, with the central server from the first server, a limitation on access or use of the at least one piece of content;

determining that the content request comprises a term of intended use of the content, and the term of intended use of the content is non-compliant with the limitation on access or use of the at least one piece of content stored in the first memory;

when the term of intended use of the content is non-compliant with the limitation on access or use of the at least one piece of content stored in the first memory, identifying, with the central server, alternative content based on a skill level of the requested content, wherein the alternative content is not included in the content request; and transmitting the alternative content to a teacher device.

17. The method of claim 16, further comprising receiving user generated content and to compile the user generated content with at least one of: the requested content, or the alternative content.

18. The method of claim 17, wherein the alternative content is identified based on effectiveness data associated with the alternative content, wherein the effectiveness data is based on feedback data received from a plurality of learner devices.

19. The networked system of claim 1, wherein the determination of the alternative content associated with the requested content is performed by:

receiving licensing information relating to a plurality of alternative content; and matching at least a portion of the licensing information for one of the alternative content of the plurality of alternative content with the terms of use information relating to the at least one piece of content.

* * * * *